United States Patent [19]

Andersson

[11] Patent Number: 5,723,790
[45] Date of Patent: Mar. 3, 1998

[54] MONOCRYSTALLINE ACCELEROMETER AND ANGULAR RATE SENSOR AND METHODS FOR MAKING AND USING SAME

[76] Inventor: Gert Andersson, Gunderjallsgatan, S-431 51 Molndal, Sweden

[21] Appl. No.: 460,488

[22] Filed: Jun. 2, 1995

[30] Foreign Application Priority Data

Feb. 27, 1995 [SE] Sweden ................... 9500729

[51] Int. Cl.$^6$ .................. G01P 15/00; G01L 1/00
[52] U.S. Cl. .................. 73/514.36; 73/514.01; 73/862.381; 437/921
[58] Field of Search .......... 73/504.01, 504.03, 73/504.04, 511, 514.01, 514.02, 514.36, 862.381; 437/225, 921

[56] References Cited

U.S. PATENT DOCUMENTS

| | | | |
|---|---|---|---|
| 4,590,801 | 5/1986 | Merhav | 73/504.04 |
| 4,750,364 | 6/1988 | Kawamura et al. | 73/504.04 |
| 4,891,984 | 1/1990 | Fujii et al. | 73/514.33 |
| 4,920,801 | 5/1990 | Church | 73/514.16 |
| 4,969,359 | 11/1990 | Mikkor | 73/514.36 |
| 5,083,466 | 1/1992 | Holm-Kennedy et al. | 73/514.33 |
| 5,095,762 | 3/1992 | Holm-Kennedy et al. | 73/862.04 |
| 5,239,870 | 8/1993 | Kaneko | 73/514.36 |
| 5,383,363 | 1/1995 | Kulmaczewski | 73/510 |
| 5,425,750 | 6/1995 | Moberg | 73/514.36 |

FOREIGN PATENT DOCUMENTS

| | | | |
|---|---|---|---|
| 0-301-816-B1 | 1/1992 | European Pat. Off. | G01P 15/08 |
| 8603209-1 | 9/1990 | Sweden | G01P 15/13 |
| 9203648-2 | 7/1994 | Sweden | G01P 15/08 |
| PCT/DE88/ 00740 | 6/1989 | WIPO | G01P 15/08 |
| PCT/US89/ 03075 | 1/1990 | WIPO | G01L 5/16 |

OTHER PUBLICATIONS

Padgaonkar, A.J.; Krieger, K.W.; King A. I., "Measurement of Angular Acceleration of a Rigid Body Using Linear Accelerometers," Journal of Applied Mechanics Sep. 1975, pp. 552–556.

Lasky, J.B., "Wafer bonding for Silicon–on–Insulator Technologies", Applied Physics Letters 48 (1) Jan. 6, 1986, pp. 78–80.

Barnaby, Roland E.; Chatterton, John B.; Gerring Fred H., "Gyrotron Angular Rate Tachometer", Aeronautical Engineering Review, Nov. 1953, pp. 31–36.

Primary Examiner—Hezron E. Williams
Assistant Examiner—Richard A. Moller
Attorney, Agent, or Firm—Robert Platt Bell & Associates, P.C.

[57] ABSTRACT

A semiconductor device for measuring force components, acceleration, and/or angular rate, formed from a single crystal (monocrystalline semiconductor substrate) comprises at least one cantilever beam inclined to the main surface of the monocrystalline material of the monocrystalline semiconductor substrate. At least one interial mass may be coupled to a corresponding at least one cantilever beam and be integrally formed from the monocrystalline semiconductor substrate. The angle of the cantilever beam to the main surface of the monocrystalline material of the monocrystalline semiconductor substrate is achieved through etching of the monocrystalline semiconductor substrate and is defined by the inclination of crystal planes constituting the beam. The bending of the inclined cantilever beam principally occurs in a direction toward the beam.

5 Claims, 9 Drawing Sheets

$$\begin{cases} F_x = \dfrac{1}{2\sin\alpha}(F_1 - F_2) = \dfrac{\sqrt{3}}{2\sqrt{2}}(F_1 - F_2) \\[6pt] F_y = \dfrac{1}{2\sin\alpha}(F_3 - F_4) = \dfrac{\sqrt{3}}{2\sqrt{2}}(F_3 - F_4) \\[6pt] F_z = \dfrac{1}{4\cos\alpha}(F_1 + F_2 + F_3 + F_4) = \dfrac{\sqrt{3}}{4}(F_1 + F_2 + F_3 + F_4) \end{cases}$$

MONOCRYSTALLINE ACCELEROMETER AND ANGULAR RATE SENSOR AND METHODS FOR MAKING AND USING SAME

CROSS-REFERENCE TO RELATED APPLICATIONS

This application is a Continuation-In-Part of International Application PCT/SE93/01040, with an international filing date of Dec. 3, 1993, now abandoned.

FIELD OF THE INVENTION

The present invention relates to accelerometers and angular rate sensors, particularly accelerometers and angular rate sensors constructed from semiconductor materials.

BACKGROUND OF THE INVENTION

Prior art cantilever beam accelerometers with adherent mass of inertia formed from a semiconductor substrate have been built and tested for linear acceleration along a dimensional axis. One type, known as an open loop accelerometer, comprises a cantilever beam formed from a semiconductor substrate, having a mass of inertia attached at its free end. The beam is formed such that it has high flexibility along an axis perpendicular to the substrate surface and high flexural rigidity along all other directions. In addition, there may be provided sensing elements such as piezoresistive sensing elements on the cantilever beam. The electric resistance of such sensing elements may vary when the beam bends due to acceleration forces acting on the mass of inertia.

One-axis open loop type accelerometers manufactured of silicon may show certain disadvantages such as high cross-sensitivity due to the center of gravity of the mass of inertia not lying on the neutral axis of the beam. Furthermore, the cross section of the beam may not be symmetrical.

A one-axis accelerometer in a semiconductor substrate with closed loop is known from Swedish patent specification SE 462997, incorporated herein by reference. A closed loop accelerometer is provided with a feedback servo mechanism for bringing the mass of inertia back it its zero position (or maintaining the mass at its zero position) during acceleration and retardation to provide higher sensitivity and linearity. One advantage with forming accelerometers in a semiconductor substrate is that both servo and signal processing circuits may be integrated into the same semiconductor substrate.

In the prior art, in order to measure acceleration along several dimensional axes using accelerometers formed in a semiconductor substrate, several one-axis accelerometers had to be used, one for each dimensional axis. Hitherto suggested three-dimensional monolithic accelerometers use one beam for every direction, for example, as disclosed in PCT application Serial No. WO 90/00735, incorporated herein by reference. If angular acceleration and angular velocity are also sought, practical experiments have shown that two additional one-axis accelerometers may be required per dimensional axis (See, e.g., Padgaonkar et. al., Journal of Applied Mechanics, p.552, Sept 1975, incorporated herein by reference).

In order to achieve a complete description of a fixed body movement, nine one-axis accelerometers located in a known way relative to each other may thus be required, or alternatively three three-axis accelerometers.

In the prior art, vibrating angular rate measurement devices or gyros of the tuning fork type or other types of vibrating bodies have been designed and tested in metal, quartz, and in silicon, of both open loop and closed loop types. It is well known in the art that gyros based upon quartz and silicon have, when compared with metal fork gyros, an advantage in that they may be miniaturized and may be manufactured relatively cheaply in a long series by batch methods. (See, e.g., Barnaby et al., Aeronautical Engineering Review, p. 31, Nov. 1953, incorporated herein by reference).

In contrast to rotating gyros, where the Coriolis force may develop a constant motion when turned, a vibrating gyro, when turned gives an oscillating moment, where amplitude is proportional to turning rate and phase indicates turning direction. Thus, such a vibrating gyro may require a more supporting electronic circuitry than a conventional rotating gyro for excitation, detection, and interpretation of a vibrating gyro signal. As silicon is a very good electronics material it may be advantageous to integrate a silicon based gyro with electronics for exciting and sensing. To manufacture and excite a traditional tuning fork in silicon has not been possible to do easily. The advantage with a tuning fork design is, that it may be made to swing in a dynamically balanced mode which gives a high Q-value, as little vibration energy is emitted to the surroundings.

Even if it would be principally possible to etch a tuning fork in silicon with the aid of modern plasma etching techniques, still there is the problem of exciting the tuning fork. In silicon the piezoelectric effect may not be directly utilized for excitation, as is possible with quartz, as silicon is not a piezoelectric material. Of course it may be possible to deposit a piezoelectric layer on silicon. However, if the structure has been etched vertically down to the substrate layer, a piezoresistive layer of even thickness may need to be deposited on the vertical walls, which may be rather problematic. Thus, the usual solution for exciting silicon based gyros has been to utilize electrostatic excitation perpendicular to the substrate surface, by manufacturing conducting plates on each side of a beam or a tilting plate with a weight, alternatively, to "glue" the entire component to a piezoelectric plate.

The gyro designs disclosed up to now, in metal, silicon and quartz have only been able to measure rotation around one axis, and if more axes have been demanded, a number of discrete mono-axis gyros have been combined to form one multi-axis gyro.

SUMMARY AND OBJECTS OF THE INVENTION

In a first embodiment of the device according to the present invention, an apparatus for measuring force components in monocrystalline material comprises four cantilever beams, each inclined at an angle to the main surface of the monocrystalline material, with adhering masses of inertia etched from the monocrystalline material. An example of such a monocrystalline material is (100) oriented ("Miller indices") monocrystalline silicon, which may be doped in order to produce conductive means where necessary.

The masses of inertia may be attached to the substrate via cantilever beams all of which have the same angle to the main surface of the monocrystalline material but the longitudinal axes of the beams may be rotated 90 degrees relative to each other. The beams and the mass of inertia are all formed through anisotropic etching of the monocrystalline material The cantilever connections of the mass of inertia to the substrate are obtained through flexible beams which may have an angle to the main surface of the monocrystalline material well-determined by the crystal structure. Thus, an angle α=54.74 degrees may be obtained with (100) silicon substrate and (111) beams. Through anisotropic etching from the opposite surfaces of a semiconductor substrate, thin beams inclined at the main surface of the monocrystalline material may be formed to connect the masses of inertia to the substrate. The width and thickness of the beams are dimensioned such that high flexibility is obtained along an axis perpendicular to the respective inclined beam and high flexural rigidity along all other directions.

Four beams with the same angle to the main surface of the monocrystalline material, z-axis, with the longitudinal axes rotated 90 degrees relative to each other may thus give four different bending directions where the relationship between bending force in a respective direction and forces along x, y, and z axes are known. Evaluation of the overdetermined equation system with four equations and three unknowns yields forces along x, y, and z axes and thereby corresponding accelerations. By using four inclined beams instead of three, greater accuracy may be provided and at the same time the signal processing electronics may be considerably simplified due to the overall symmetry of the measuring device.

A type I measuring device may be obtained by selecting a configuration where the center of gravity for all the masses of inertia are located close to origin. A type I measuring device may be sensitive to accelerations along x, y, and z axes, but may be relatively insensitive to angular accelerations and angular velocity.

A type II measuring device may be obtained by locating four masses of inertia, two on the x-axis and two on the y-axis on opposite sides of origin and with the longitudinal axes of the inclined beams being directed along the coordinate axes. A type II measuring device may be sensitive to accelerations along x, y, and z axes, and for angular accelerations, but may be insensitive to angular velocities.

A type III measuring device may be formed by locating four masses of inertia symmetrically on a square with the longitudinal axes of the inclined beams directed along the sides of the square. Such a type III measuring device may be sensitive to accelerations along the x,y, and z axes, and to angular accelerations and angular velocities.

By integrating all three types (i.e., types I, II, and III) on the same substrate and with the same origin for types I, II, and III, all the linear accelerations, angular accelerations and angular velocities along x, y, and z axes may be calculated. Alternatively, three measuring devices of arbitrary types may be located with different origins at a known distance from each other directly on the semiconductor substrate, making it possible to calculate all linear accelerations, angular accelerations and angular velocities along x, y, and z axes.

A measuring device in monocrystalline materials may be manufactured by means of well-known semiconductor manufacturing methods comprising for example photolithographic patterning and anisotropic etching. Such techniques provide many advantages including close tolerance control, possibility to integrate all or some of the signal processing electronics in one single mutual substrate of relatively moderate size, and utilize a technology which makes effective mass production possible through batch production. Furthermore, damping of an open loop measuring device may easily be accomplished due to the high non-reactivity of silicon with other chemicals. For example, the whole measuring device with electronics and all may be placed in a damping oil of suitable viscosity.

When a zero-balanced closed-loop measuring device is desired, patterned conductive surfaces may be located on opposite sides of the masses of inertia with so-called "Silicon Direct Bonding". This method, which has been known since 1986 (See, e.g., Lasky, Applied Physics Vol 48, p.78, 1986, incorporated herein by reference) makes bonding of, for example, silicon to silicon, silicon to silicon dioxide and silicon dioxide to silicon dioxide possible. "Silicon Direct Bonding" may also be used to apply mechanical stops for cantilever beams such that the beams do not break if exposed to greater forces than they were intended for.

A second embodiment of the present invention includes a vibrating gyro, designed from a semiconducting substrate to enable designs like tuning forks, which may be readily excitable, fixed either directly to a substrate or via torsion axes. Such tuning fork gyros may be integrated with a three-axes accelerometer utilizing the manufacturing techniques discussed above for manufacturing three-axes accelerometers.

Dependent upon application, the invention may be integrated into several configurations on the same substrate and together with accelerometers, to enable simultaneous measurement of rotation around several axes, possibly combined with measurement of acceleration. Furthermore, dependent upon the precision demanded, the device may be made either with an open or a closed loop. The utilization of well known silicon technology when manufacturing enables mass production at a low cost with a high precision and reliability.

A type I vibrating gyro for measurement of angular rate may comprise two beams inclined to the main surface of the monocrystalline material with or without attached inertial masses etched from monocrystalline materials. An example of such a material is (100)-oriented ("Miller index"), monocrystalline silicon, which may be doped to create conducting means where such are needed. The beams may either be fixed directly to the substrate or via one further beam, such that a structure like a tuning fork is achieved.

In a type I vibrating gyro, all beams may have the same longitudinal direction and have the same angle to the main surface of the monocrystalline material, which may be positive or negative in the xz-plane in a coordinate system, where the y-axis is directed along the beam and the z-axis is perpendicular to the substrate surface. The beams and the inertial masses, if present, may all be formed by anisotropic etching of the monocrystalline material.

A type II vibrating gyro for measurement of angular rate may comprise two beams inclined to the main surface of the monocrystalline material with or without attached inertial masses, dependent from a frame, which via beams (torsion axes) are connected to a substrate, with all elements etched from a monocrystalline material. Again, an example of such material is (100)-oriented ("Miller index"), monocrystalline silicon, which may be doped to create conducting means, where such are needed.

In a type II vibrating gyro, the beams may either be fixed to the same side of the frame or to opposite sides of the frame. All beams may have the same longitudinal direction and the same angle to the main surface of the monocrystalline material, which may be positive or negative in the xz-plane in a coordinate system, where the y-axis is directed along the beam and the z-axis is perpendicular to the substrate surface. The beams and the inertial masses, if present, may all be formed by anisotropic etching of the monocrystalline material.

A type III vibrating gyro for measurement of angular rate comprises two opposite beams, inclined to the main surface of the monocrystalline material (torsion axes) for carrying an inertial mass, which via the beams are dependent upon a frame, which in turn is connected to the substrate via two opposite beams (torsion axes), inclined to the main surface of the monocrystalline material, which beams are turned 90 degrees in relationship to the first pair of beams, with all elements being etched from a monocrystalline material. Again, an example of such a material is (100)-oriented ("Miller index"), monocrystalline silicon, which may be doped in order to create conductive means where such are needed.

In a type III vibrating gyro, the beams in the pairs of beams may have the same longitudinal direction and have the same angle to the main surface of the monocrystalline material, but the two pairs of beams are turned 90 degrees mutually. The beams and inertial masses, if present, may all be formed by anisotropic etching of the monocrystalline material.

The connections of frames/vibrating bodies to the substrate is achieved by flexible beams, which have an angle to the main surface of the monocrystalline material, well defined by the crystal structure. By anisotropic etching from opposite surfaces of a semiconducting substrate there are created beams, inclined to the main surface of the monocrystalline material, which beams connect the vibrating bodies or alternatively the frames to the substrate. The width and thickness of the beams may be dimensioned such that a high bend flexibility is achieved along an axis perpendicular with respect to the inclined beam with a high bend rigidity along all other directions, or alternatively such that the bend rigidity will be similar in all directions, which may be preferred when beams are utilized as torsion axes.

A type I vibrating gyro is an example of a device according to the invention for measurement of angular rate, which are best suited to open loop embodiments. Type II and III configurations are well adapted to a closed loop design. All configurations are well adapted to integration together with an mono-or multi-axes accelerometer, discussed above with regard to the first embodiment of the present invention. Integration of two sets of type I or type II vibrating gyros, or one set of type III vibrating gyros and one three-axes accelerometer from the first embodiment of the present invention in the same substrate enable simultaneous measurement of all six degrees of freedom necessary to completely describe the movement of a free body in the space.

A device in monocrystalline material is available for manufacture by well known manufacturing methods for semiconductors comprising, for example, photolithographic patterning and anisotropic etching which provide many advantages including exact control of tolerances, possibility to integrate the complete or part of the electronics for signal treatment into one single common substrate with a relatively small size, and provide access to a technology, which enables efficient mass production by batch-manufacture.

When a zero-balanced closed-loop device is desired, conductive surfaces with a pattern may be placed on opposite sides of beams and the inertial masses for example, by so called "Anodic bonding" or "Silicon Direct Bonding." "Anodic Bonding" enables joining of quartz glass to silicon, oxides nitrides, and metals at a low temperature (usually 300–400 degrees by application of an electrical field over the joint). "Silicone Direct Bonding" which has been known since 1986 (Lasky, Applied Physics Letters Vol 48, p 78, 1986) enables joining of silicon to silicon, silicon to silicon oxide, and silicon oxide to silicon oxide. "Silicon Direct Bonding" and "Anodic Bonding" may also be utilized to place mechanical stops for beams such that they are not broken if they are exposed to larger forces than they are intended for. If the bonding is performed in a vacuum, the technique may simultaneously be utilized as a method for vacuum encapsulation of the device.

It is an object therefore, of the present invention to provide an integrated accelerometer construction formed from a semiconductor substrate which may simultaneously measure linear acceleration along three dimensional axes.

It is a further object in one embodiment of the present invention to provide an integrated accelerometer construction without sensitivity to angular acceleration and angular velocity about the dimensional axes.

It is a further object of the present invention to reduce high cross-sensitivity in one-axis accelerometers.

It is a further object of the present invention to simplify manufacturing process for integrated accelerometers formed on a silicon substrate.

It is a further object of the present invention to integrate in one accelerometer construction on a silicon substrate, several configurations on the same substrate making it possible to have simultaneous coverage of several measuring ranges or alternatively making it possible to measure simultaneously linear acceleration, angular acceleration and angular velocity along three dimensional axes.

It is a further object of the present invention to use well-developed silicon technology in the manufacturing of the present invention to make mass production possible at low cost with high accuracy and reliability.

It is a further object of the present invention to simplify manufacturing process for integrated vibrating gyros formed on a silicon substrate.

It is a further object of the present invention to integrate in one vibrating gyro construction on a silicon substrate, several configurations on the same substrate making it possible to have simultaneous coverage of several measuring ranges.

BRIEF DESCRIPTIONS OF THE DRAWINGS

Figure 5:
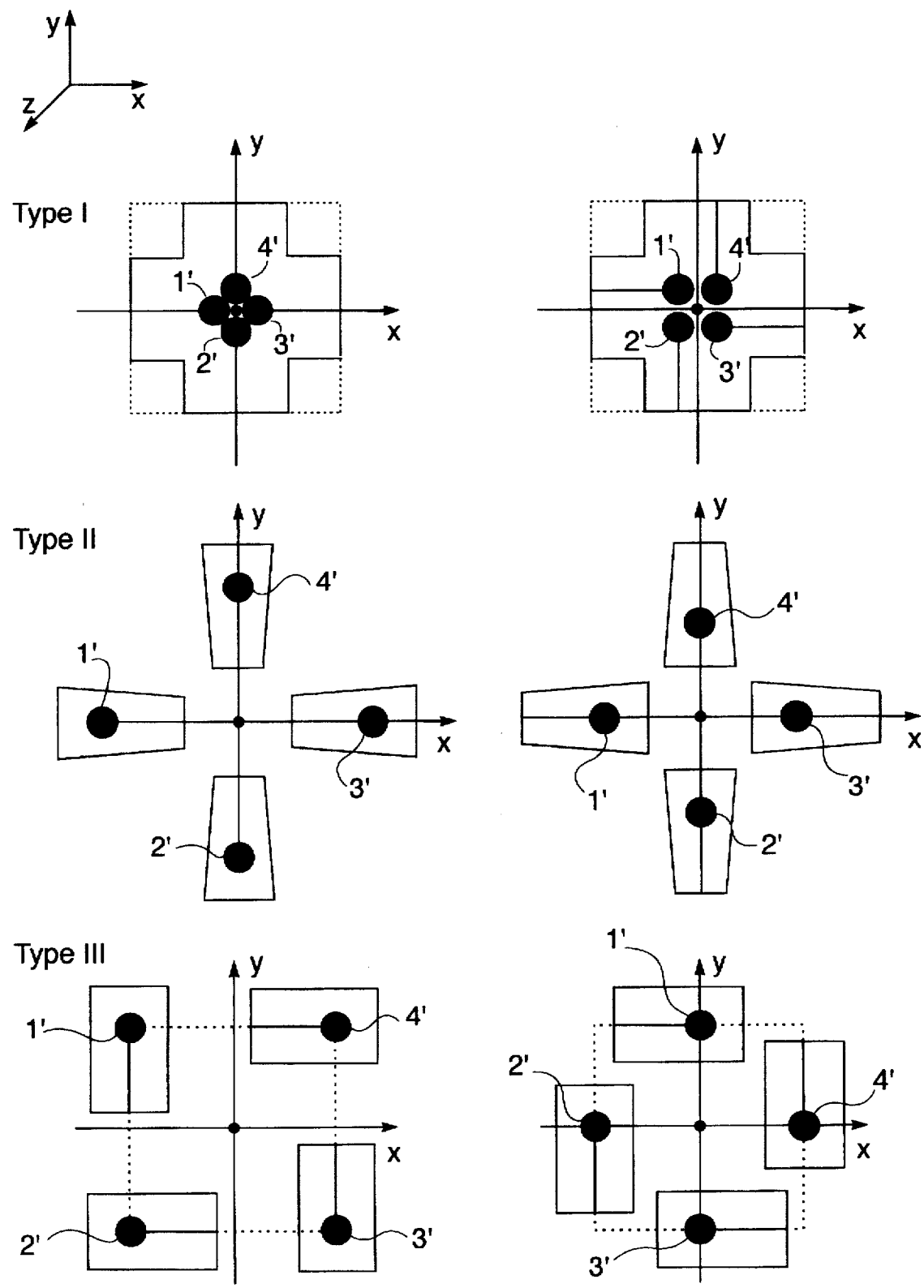

FIG. 5 illustrates schematically type I, type II and type III accelerometer configurations of inclined cantilever beams and masses of inertia, where all types are sensitive to accelerations along the x, y, and z axes, and where type I is relatively insensitive to angular accelerations and angular velocities, type II is sensitive to angular accelerations but insensitive to angular velocities, type III is sensitive both to angular accelerations and angular velocities.

Figure 6:
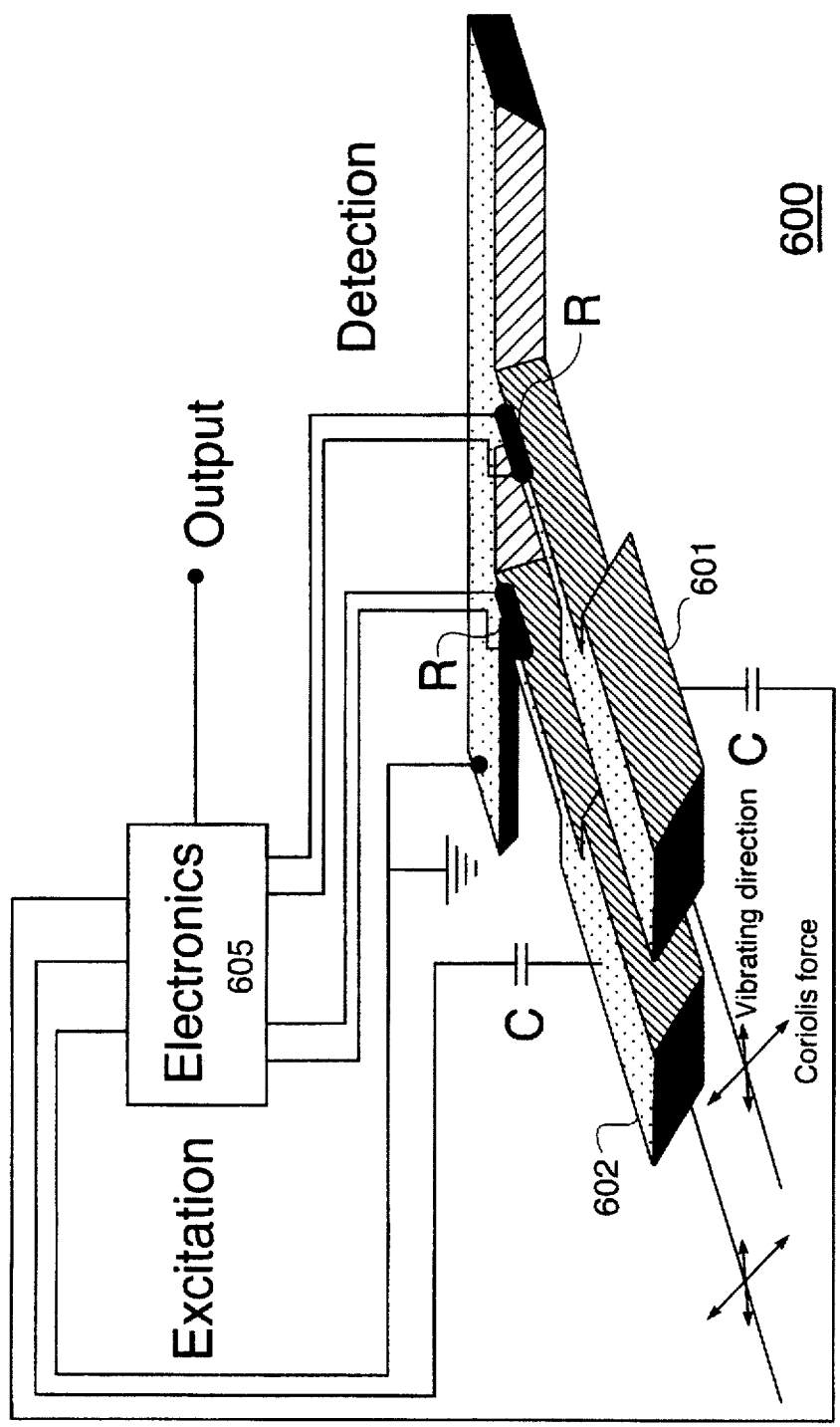

FIG. 6 illustrates, schematically, one configuration of a type I vibrating gyro according to the present invention with circuits for excitation and detection.

Figure 7:
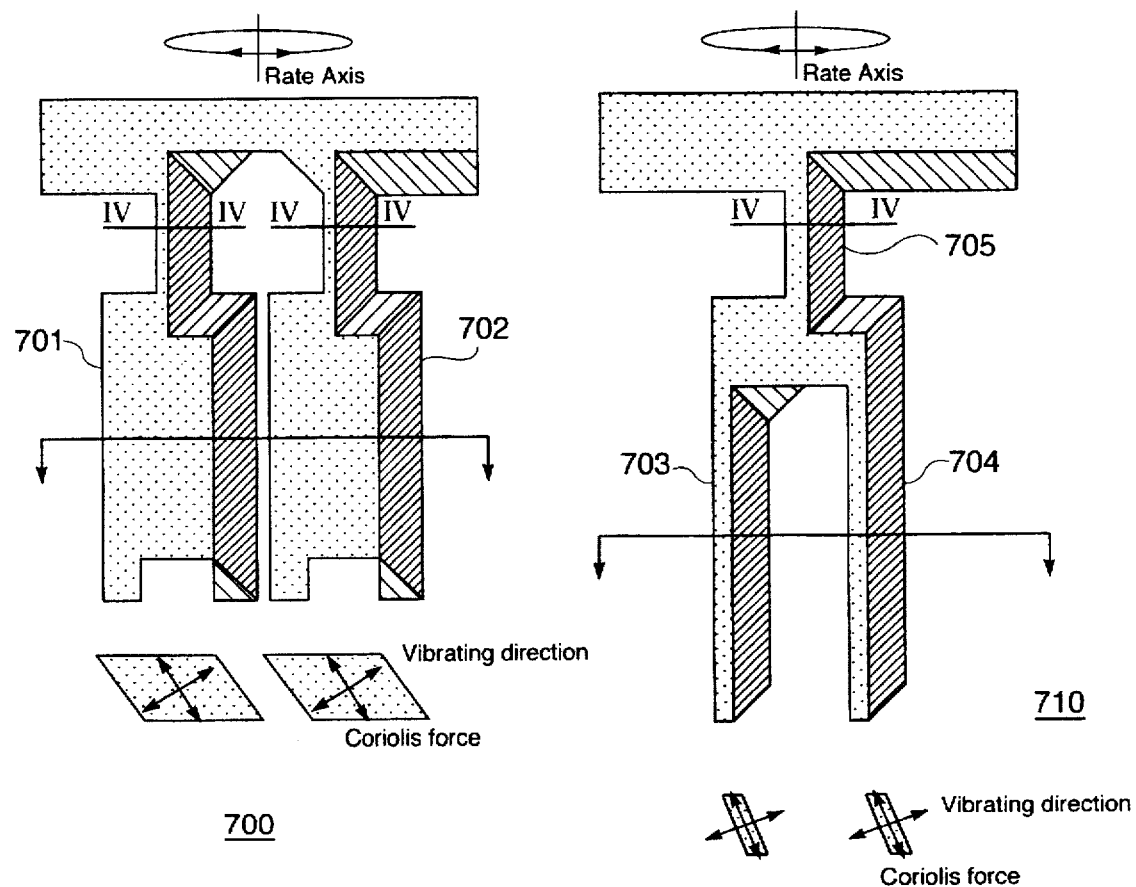

FIG. 7 is a plan view and a cross section of two configurations of a type I vibrating gyro according to the present invention.

Figure 8:
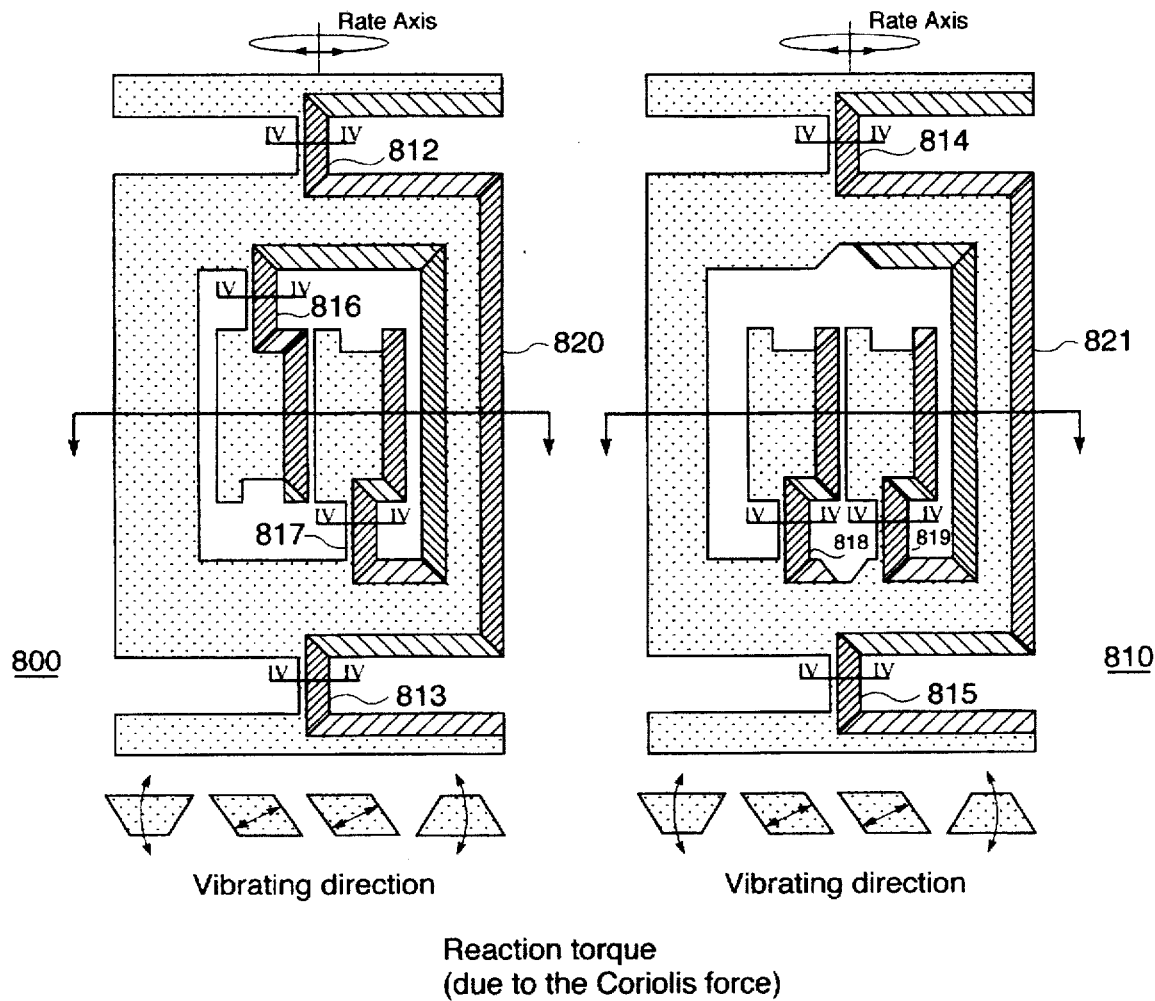

FIG. 8 is a plan view and a cross section of two configurations of type II vibrating gyros according to the present invention.

Figure 9:
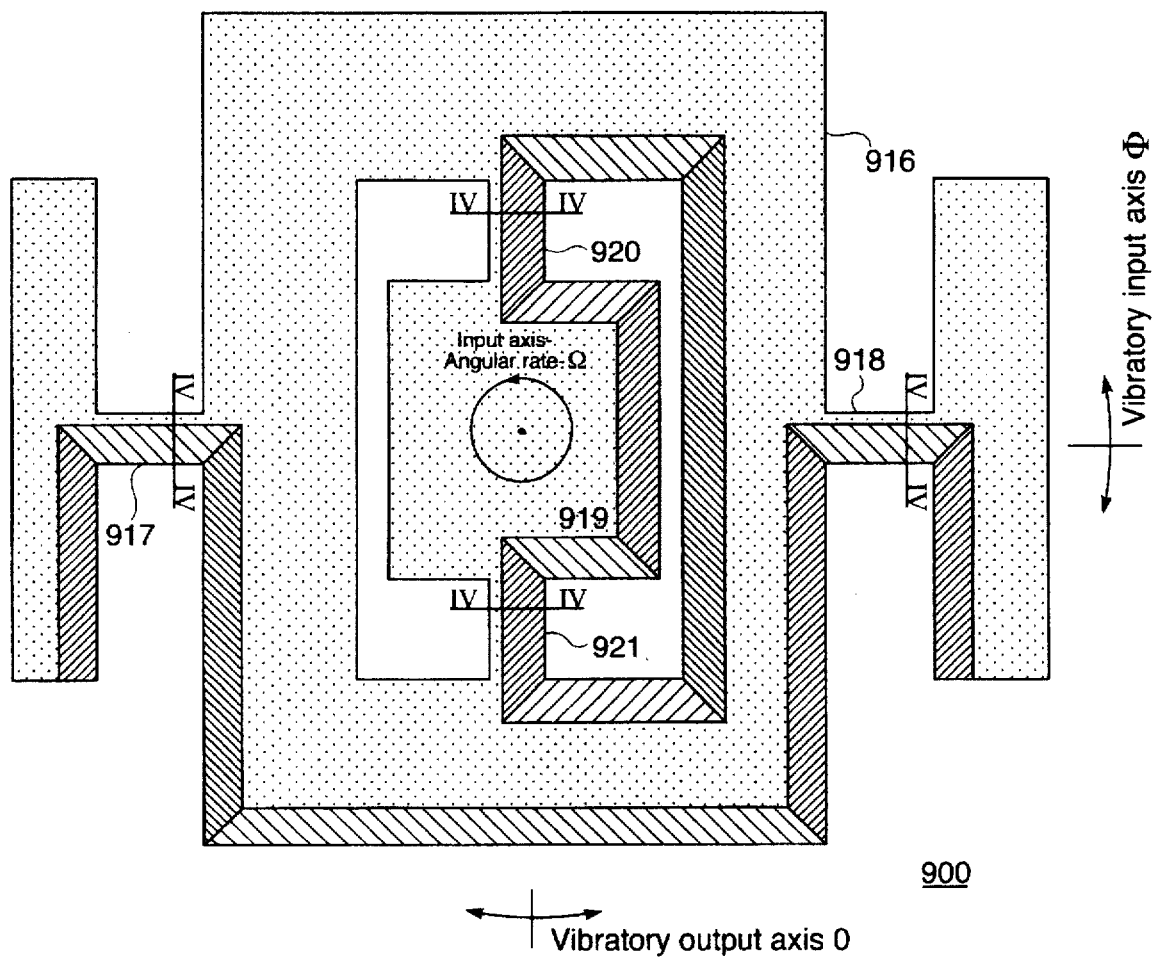

FIG. 9 is a plan view and a cross section of one configuration of a type III vibrating gyro according to the present invention.

Figure 10:
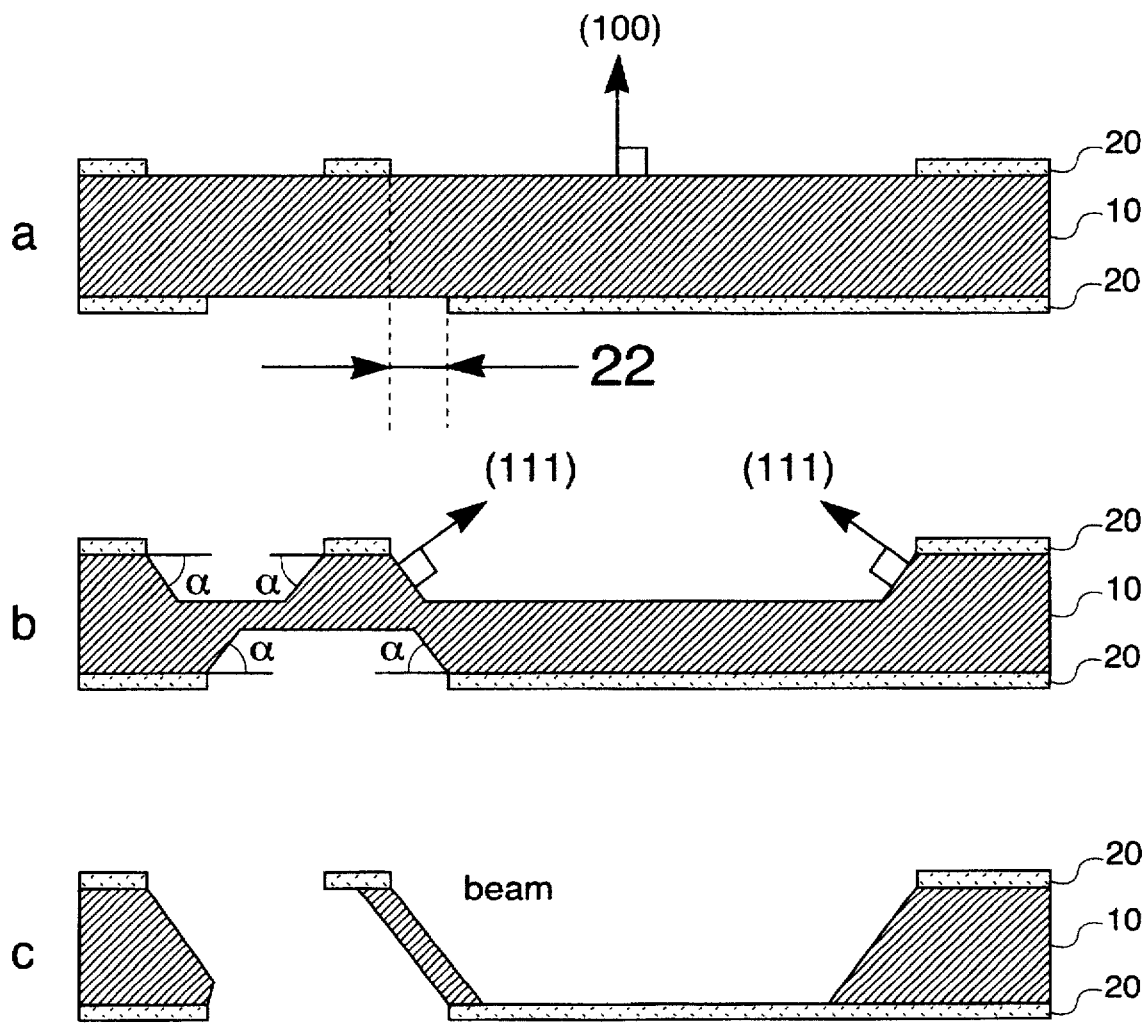

FIG. 10 illustrates a cross section in three time steps along the line IV—IV in FIGS. 7, 8, and 9 to illustrate the progress of the anisotropic etching at the manufacture of a beam inclined to the substrate surface.

DETAILED DESCRIPTION OF THE INVENTION

Figure 1:
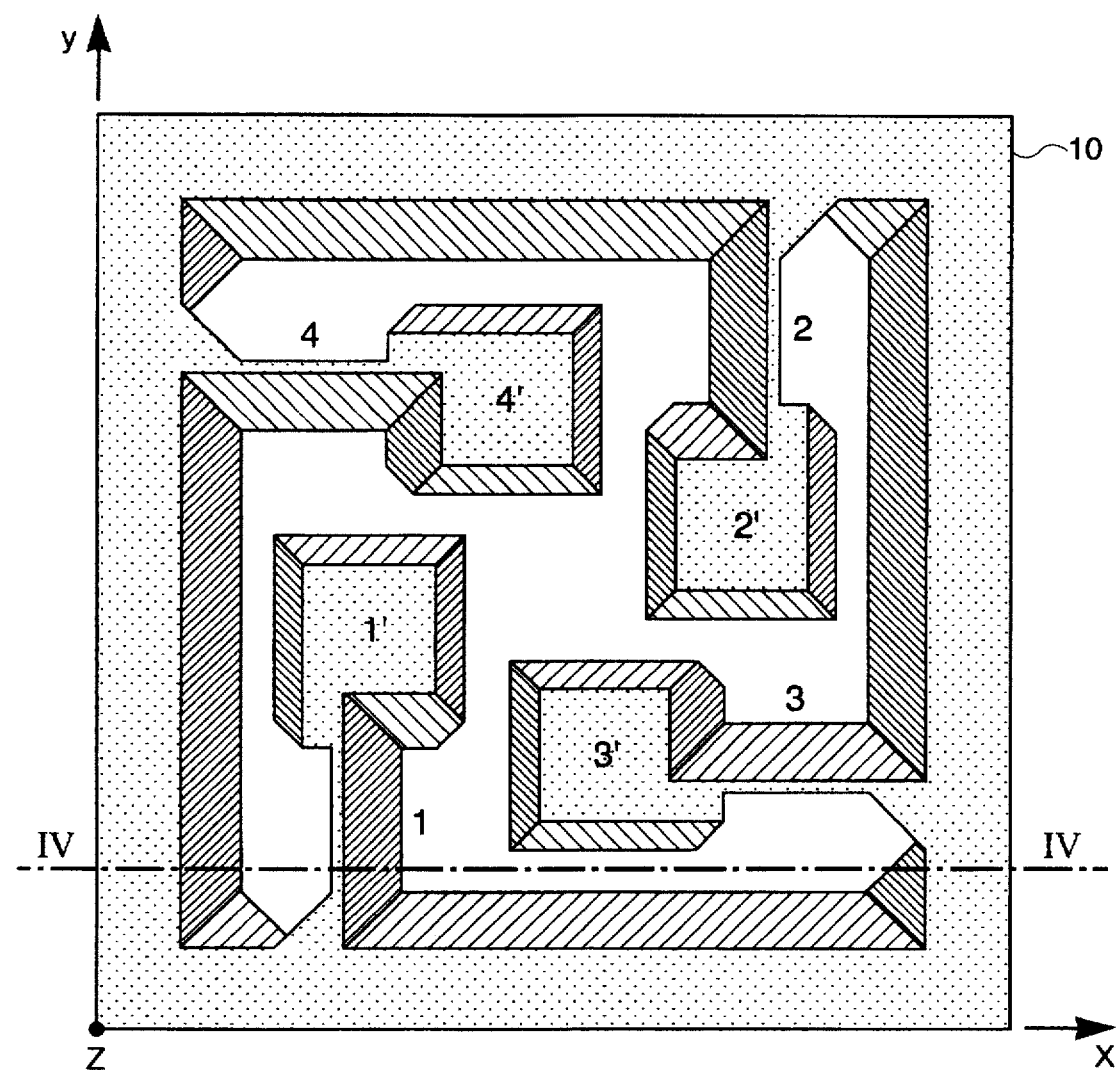
FIG. 1 is a plan view of the inclined cantilever beams with adhering mass of inertia according to the invention.

FIG. 1 is a plan view of four inclined cantilever beams 1, 2, 3, and 4 with adhering masses of inertia 1', 2', 3', and 4'. When forming a measuring device in a (100) oriented silicon substrate 10 the indicated x and y axes may be oriented along (110) directions and the z axis may be oriented normal to the surface of silicon substrate 10 along the (100) direction.

When manufacturing a measuring device in (100) silicon substrate 10, thermal oxidation may be initially performed to provide a protective silicon dioxide layer 20 on the surfaces of silicon substrate 10. Silicon dioxide layer 20 may be used as mask during anisotropic etching, whereupon silicon dioxide layer 20 may be patterned via a photolithographic process on both substrate surfaces such that the formed openings in silicon dioxide layer 20 are aligned along the (110) directions. Alternatively, silicon nitride, gold, chromium, and various materials may be used as etch mask depending on the type of anisotropic etch solution used.

Openings on opposite sides of silicon substrate 10 may be displaced relative to each other where a beam 1, 2, 3, or 4 is desired (as indicated by dimension 5 in FIG. 3) such that the desired thickness of beams 1, 2, 3, and 4 is obtained after etching. Silicon substrate 10 may then be etched through, from both sides of silicon substrate 10 with an anisotropic etch to selectively etch the (111) planes, which form beams 1, 2, 3, and 4 much more slowly than the (100) and (110) planes. For example, an ethylene diamine/pyrocathecol (EDP) based etch or a potassium hydroxide (KOH) based etch may be used for this purpose. The latter etch solutions may be heated such that a desired etching effect is achieved. For example, KOH may be heated to about 80 degrees (centigrade) and EDP to about 110 degrees (centigrade).

Figure 2:
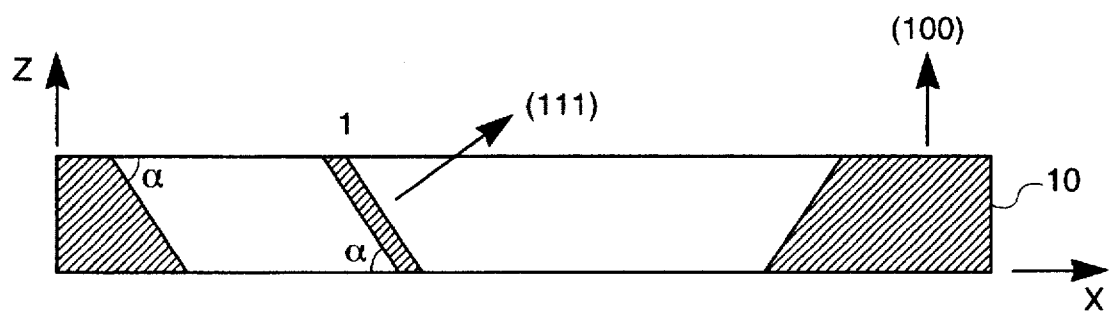
FIG. 2 is a cross-section view along the line IV—IV in FIG. 1.
Figure 3:
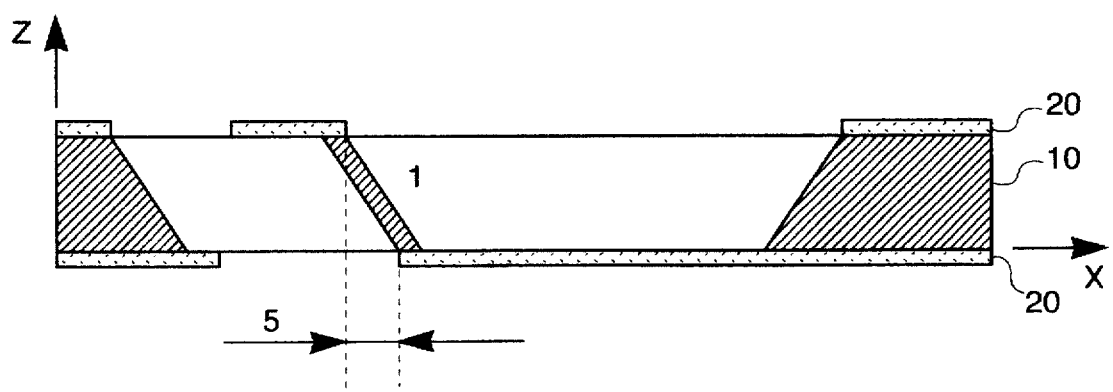
FIG. 3 is a cross-section view along the line IV—IV in FIG. 1 with the etch mask which is used during the anisotropic etching.

As is best seen from the cross-section IV—IV in FIG. 2 and FIG. 3, the thickness of inclined beams 1, 2, 3, and 4 may be easily and most accurately defined by the photolithographic process as defined by dimension 5. The etching is, so to speak, self stopping which provides high reproducability of beam thickness in contrast to etching processes which are stopped according to time, the usual method for manufacturing cantilever beams parallel to a substrate surface. Using time-stop etching, it may be difficult to obtain an even etching speed over large areas, which means that the beam thickness may vary considerably over a wafer. Etching times may be on the order of 3–4 hours and the etching speed on the order of 1–2 μm/min.

Figure 4:
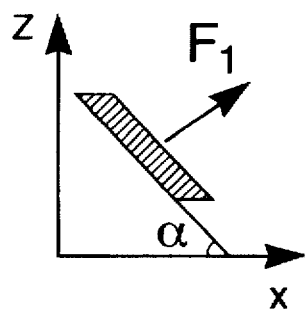
FIG. 4 illustrates the bending forces on the inclined beams and how these are related to the x, y, and z forces.
Figure 4:
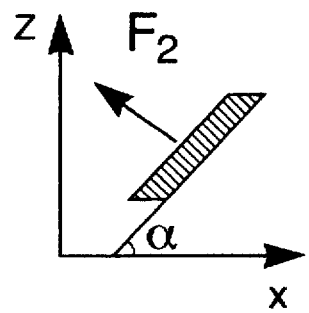
Figure 4:
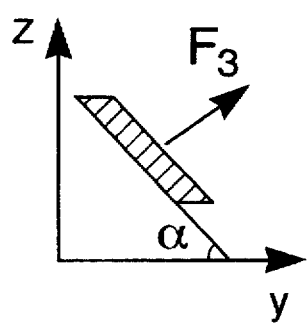
Figure 4:
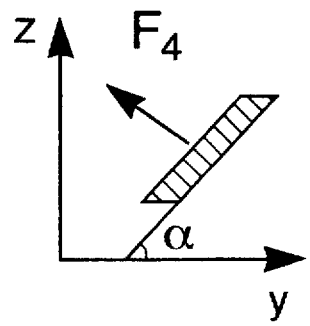

FIG. 4 illustrates how the bending forces $F_1$, $F_2$, $F_3$, and $F_4$ acting on the inclined beams are related to the x,y, and z forces $F_x$, $F_y$, and $F_z$. As is evident from the solution to the overdetermined equation system in FIG. 4, the use of four inclined beams with longitudinal axes rotated at 90 degrees relative to each other instead of the typical three, simplifies the calculation of $F_x$, $F_y$, and $F_z$ such that it may be implemented with single resistances in conjunction with three operational amplifiers one for each force component.

Manufacturing of the measuring device in silicon substrate 10 makes it possible to integrate the signal processing electronics in the silicon substrate 10 with the measuring devices together with, for example, filter functions, other data processing electronics or servo-electronics for a closed-loop measuring device.

Detection of movements of masses of inertia 1', 2', 3', and 4' may be readily achieved by aid of the piezoresistive effect by forming resistances through doping of portions of silicon substrate 10. To obtain maximum sensitivity it may be suitable to use a balanced bridge connection comprising four resistances located in a suitable way as is known in the art.

Furthermore, to obtain maximum piezoresistive effect the resistances may be located where bending of a beam 1, 2, 3, or 4 is close to the attachment point to the remainder of silicon substrate 10 along the normal of the inclined beam 1, 2, 3, or 4. It may therefore be optimal to place two resistances on either side of the inclined beam 1, 2, 3, or 4 close to the attachment point to silicon substrate 10.

One alternative which may provide poorer resolution, but is considerably easier to implement, is to locate one or two resistances on an upper side of a beam 1, 2, 3, or 4 along the outer edge close to the attachment point to the remainder of silicon substrate 10 and two and three resistances respectively, within silicon substrate 10. Alternatively one or two resistances may be provided on an upper side and one or two resistances may be provided on the underside of a beam 1, 2, 3, or 4.

In one embodiment of a closed loop measuring device, detection of movements of masses of inertia 1', 2', 3', and 4' may be performed capacitively. The return and prestressing of a mass of inertia 1', 2', 3', or 4' may occur by means of an electric fields between masses of inertia 1', 2', 3' and 4' and surrounding conductive plates.

Two capacitors may be provided per mass of inertia 1', 2', 3' or 4', each of which whose capacity varies with position of the corresponding mass of inertia 1', 2', 3', and 4'. Displacement of a mass of inertia 1', 2', 3', or 4' may be detected with the aid of a capacity bridge, which in turn provides a signal to a servo system to alter the electric field such that the corresponding mass of inertia 1', 2', 3', or 4' is brought back to a zero position.

For special applications, it may also be conceived to use optical detection of movements of masses of inertia 1', 2', 3', and 4', for example, by using interference phenomena or by using an arrangement where the position of a reflected light beam depends on position of a mass of inertia 1', 2', 3' or 4'.

FIG. 5 illustrates different configurations of a measuring device sensitive to linear accelerations along the x,y, and z axes comprising four inclined beams with adhering masses of inertia 1', 2', 3', and 4'. Type I is an example of two configurations where the center of gravity of the masses of inertia 1', 2', 3', and 4' have been placed as close as possible to the origin in order to minimize sensitivity to angular accelerations and angular velocities (a configuration where the masses of inertia 1, 2', 3' and 4' have been located symmetrically along the x and y axes is insensitive to angular velocities about the coordinate axes).

Type II is an example of two configurations where the center of gravity of masses of inertia 1', 2', 3' and 4' have been located with masses of inertia 1' and 3' on the x-axis and masses of inertia 2' and 4' on the y-axis on opposite sides of the origin and with the longitudinal axes of the inclined beams directed along the coordinate axes in order to give a measuring device which is insensitive to the angular velocity about the coordinate axes.

Type III is an example of two configurations where the center of gravity of the masses of inertia 1', 2', 3', and 4' have been located symmetrically on a square with the longitudinal axes of the inclined beams directed along the sides of the square to provide a measuring device which is sensitive both to the angular acceleration and the angular velocity about the coordinate axes (the configuration where the masses of inertia 1', 2', 3', and 4' have been located symmetrically on the x- and y-axes is insensitive to angular accelerations about the z axis).

A second embodiment of the present invention is illustrated in FIG. 6, where a configuration of a type I vibrating gyro 600 for measurement of angular rate is provided where relevant circuits for excitation an detection are shown schematically in one embodiment with capacitive excitation and piezoresistive detection. Capacitances C excite device 600, such that beams 601 and 602 swing in opposite phases, and piezoresistances R may be used to measure wave amplitude and phase. Wave amplitude and phase are fed back to excitation circuit and analyzing electronics 605, which calculates angular rate.

In one embodiment where a beam is used as a torsion axis for sensing the oscillating coriolis force, piezoresistive detection may be used to detect, instead, a turning beam/torsion axis.

FIG. 7 is a plan view and a cross section of two configurations of type I vibrating gyros 700, 710 for measurement of angular rate. Both gyros 700, 710 comprise two vibrating inclined beams 701, 702 and 703, 704, respectively. The cross-sections illustrate Coriolis forces perpendicular to the amplitude of vibration. In gyro 710, when the tuning forks 703, 704 swing in opposite phases, the force in each leg in a fork will be directed in an opposite direction such that the inclined beam 705 will be exposed to a torque, cooperating from legs 703, 704, oscillating when the device is turned around an axis, coinciding with the longitudinal direction of the beams, as in indicated in FIG. 7.

FIG. 8 is a plan view of two configurations of vibrating tuning fork gyros 800, 810 according to the invention of the so called "gyrotrone" type, here named type II, both consisting of two vibrating inclined beams 806, 807 and 808, 809, respectively fixed to frames 820 and 821, which, via two inclined beams/torsion axes 812, 813 and 814, 815 are fixed to the substrate. The cross-sections illustrate torque generated by the Coriolis force, acting upon frames 820, 821 when gyros 800, 810 are turned around an axis coinciding with the longitudinal direction as indicated in FIG. 8.

FIG. 9 is a plan view of a configuration of a type III vibrating gyro 900 where frame 916 is excited such that it tilts in a plane around an axis in the longitudinal direction of the beams/torsion axes 917, 918. Mass 919 may in turn be dependent upon two beams/torsion axes 920, 921 which are rotated 90 degrees relative the dependence of frame 917, 918. When device 900 is turned around an axis perpendicular to the substrate, the Coriolis forces will act upon mass 919 such that it will start swinging around an axis in the longitudinal direction of beams/torsion axes 917, 918 as is indicated in FIG. 9.

Referring now to FIG. 10, when manufacturing a device in a (100) oriented silicon substrate 10, inclined beams may be oriented along the /110/ direction. In addition, when manufacturing a device in a (100) silicon substrate 10, masking of the surface of silicon substrate 10 may first be made by thermic oxidation to provide a protecting silicon oxide layer 20 on the surfaces of silicon substrate 10. Silicon dioxide layer 20 may be patterned via a photolithographic process on both surfaces of silicon substrate 10 such that openings formed in silicon dioxide layer 20 are liniated along the /110/-directions, whereupon this layer is used as a mask during anisotropic etching. Alternatively, silicon nitride, gold, chromium and diverse other materials may be used as masking layers.

Openings on opposite sides of silicon substrate 10 may be displaced relative to each other where a beam is desired (as indicated by dimension 22 in FIG. 10) such that a desired beam thickness is achieved after etching. Silicon substrate 10 may then etched through from both sides of silicon substrate 10 with an anisotropic etch, which selectively etches the (111) planes to form the beams much slower than the (100) and (110) planes. For example, an etch, based upon ethylenediamine/pyrocathecol (EDP) or upon potassiumhydreoxide (KOH) may be used. These etches mentioned are heated to achieve the desired etching effect, for example, for KOH at 80 degrees centigrade and EDP at 110 degrees centigrade.

As is best seen from the cross section in FIG. 10, the manufacturing process is shown in the equivalent section lines IV—IV in FIGS. 7, 8, and 9. FIG. 10a illustrates a (100)-oriented substrate 10 deposited by an etching mask 20 which is patterned. As is indicated, the thickness of etching mask 20 may be easily and exactly controlled on an inclined beam by the photolithographic process as indicated by dimension 22. FIG. 10b illustrates substrate 10 after about half of the etching time has elapsed. As is apparent from FIG. 10b, etching is stopped against the (111)-crystal planes and forms cavities with walls, which have an angle α to the main surface of the monocrystalline material, as determined by the crystal structure.

FIG. 10c illustrates a substrate etched to a complete inclined beam, and as is seen, in principle all non-masked surfaces are limited by (111) crystal planes. The etching is self-stopped laterally, which provides a high reproductivity of beam thickness, in opposition to etching processes which are stopped by time, which is a method, which is used to form beams and membranes parallel to the substrate surface.

Another technique for manufacturing beams and membranes parallel to the substrate surface, which provides higher reproductivity is utilizing an electrochemical etching stop. However, when compared with this method a photolithographically defined etching stop technique has advantages in the manufacture.

The manufacture of the device in a semiconductor substrate enables exciting detection and electronics for signal treatment may be integrated in the same substrate as the device together with, for example, filter functions, other computer electronics or servo electronics for closed loop devices.

In order to start a vibrating gyro in a swinging motion, active exciting may be required. A number of techniques are available to excite a vibrating gyro, such as capacitive, thermic, piezoelectric films and the like. The method chosen is dependent upon the embodiment, encapsulation and the demand for precision. With capacitive exciting, the structure is usually excited via an oscillating electrical field between plate capacitors suitably placed. Exciting may be achieved directly between two movable mechanical parts, alternatively between one or several fixed parts and one movable part. Thermic exciting is achieved in which the beam or beams is (are) heated locally via a resistances or a source for radiation, (e.g., pulsed laser) such that a tension gradient is achieved in the beam or beams. If the thermic exciting is created by a frequency, which is close to the natural frequency for the structure, the beam or beams may be made to swing at their natural frequency.

By depositing one or more layers of piezoelectrical films (e.g., ZnO) to the inclined beams, which are contacted in a suitable way, and then by applying an electrical field over the piezoelectrical film, the beams may also be brought to swing.

As is the case for exciting, a number of principles are available for detecting swing: capacitive, resonant strain transducers, peizoresistive, or the like. Dependent upon the embodiment and desired precision the principle chosen, for example, for a closed loop type, detection of oscillation generated by Coriolis forces may be suitably made capacitively, as the feed back and possible preset bias may created by an electrical field between the beam/frame/mass and surrounding conductive plates. This gives access to capacitors on each side of the beam/frame/mass the capacitance of which is varied with the position of the device and a displacement may be detected with the aid of a capacitance bridge, which in turn gives a signal to a servo system which changes the electrical field such that the beam/frame/mass is (are) returned to the zero position.

A resonant strain transducer may be an interesting detection method if the device shall in any case be encapsulated in vacuum. These have a very high Q-value and give very high resolution. Piezoelectrical detection may be an interesting method if exciting is in any case performed piezoelectrically such that a piezoelectric layer is available without any extra process step. A simple method to achieve detection of movements of inclined beams is by the aid of the piezoresistive effect, which resistors formed by doping of silicon substrate 10 may provide. In order to obtain maximal sensitivity it may be suitable to utilize a balanced bridge circuit, comprising four resistors located in a suitable way.

Furthermore, to obtain maximal piezoresistive effect, the resistors may be placed where the strain in the beam, caused by the bend/turning which is desired to be detected has its maximum. For special applications it is also possible to utilizing optical detection of the movement of the beam/frame/mass, for example by utilizing interference phenomena or by utilizing an arrangement, where the position of a reflected light beam is dependent upon the position of the beam/frame/mass.

While the preferred embodiment and various alternative embodiments of the invention have been disclosed and described in detail herein, it may be apparent to those skilled in the art that various changes in form and detail may be made therein without departing from the spirit and scope thereof.

What is claimed is:

1. A semiconductor device formed from a monocrystalline semiconductor substrate having a substantially planar main surface, for measuring force components, said semiconductor device comprising:

at least one cantilever beam formed in said monocrystalline semiconductor substrate, said at least one cantilever beam having a surface inclined non-parallel, non-perpendicular to the main substrate plane of said monocrystalline semiconductor substrate wherein inclination of the at least one cantilever beam to the main surface of said monocrystalline semiconductor substrate is achieved through etching of the monocrystalline semiconductor substrate and said surface of said at least one cantilever beam being defined by one crystal plane of said monocrystalline semiconductor substrate inclined non-parallel, non-perpendicular with respect to the main surface of said monocrystalline semiconductor substrate and that bending of each of the at least one cantilever beams occurs substantially along an axis perpendicular to said inclined surface; and at least one mass of inertia, coupled to a corresponding one of said at least one cantilever beam.

2. The semiconductor device according to claim 1, wherein each of said at least one mass of inertia has a surface parallel to the surface of said at least one cantilever beam.

3. The semiconductor device according to claim 2, wherein said at least one cantilever beam comprises at least two cantilever beams, each of said at least two cantilever beams formed in equivalent crystal planes of said monocrystalline semiconductor substrate and having the same angle to the main surface of said monocrystalline semiconductor substrate, the longitudinal axes of each of said at least two cantilever beams being formed an angle characteristic of the monocrystalline material, said at least two cantilever beams being rotatable relative to each other at an angle characteristic of the monocrystalline material.

4. The semiconductor device according to claim 3, wherein said at least one mass of inertia comprises at least two masses of inertia, each coupled to a respective one of said at least two cantilever beams, wherein said at least two cantilever beams and said at least two masses of inertia are manufactured of said monocrystalline semiconductor substrate.

5. The semiconductor device according claim 4, wherein said monocrystalline semiconductor substrate comprises a silicon monocrystalline semiconductor substrate, said main surface of said monocrystalline semiconductor substrate lies in a <100> crystal plane, said surface of said at least one cantilever beam lies in a <111> crystal plane at an angle of substantially 54.7 degrees from the main surface of said semiconductor substrate.

* * * * *